Patented Sept. 9, 1952

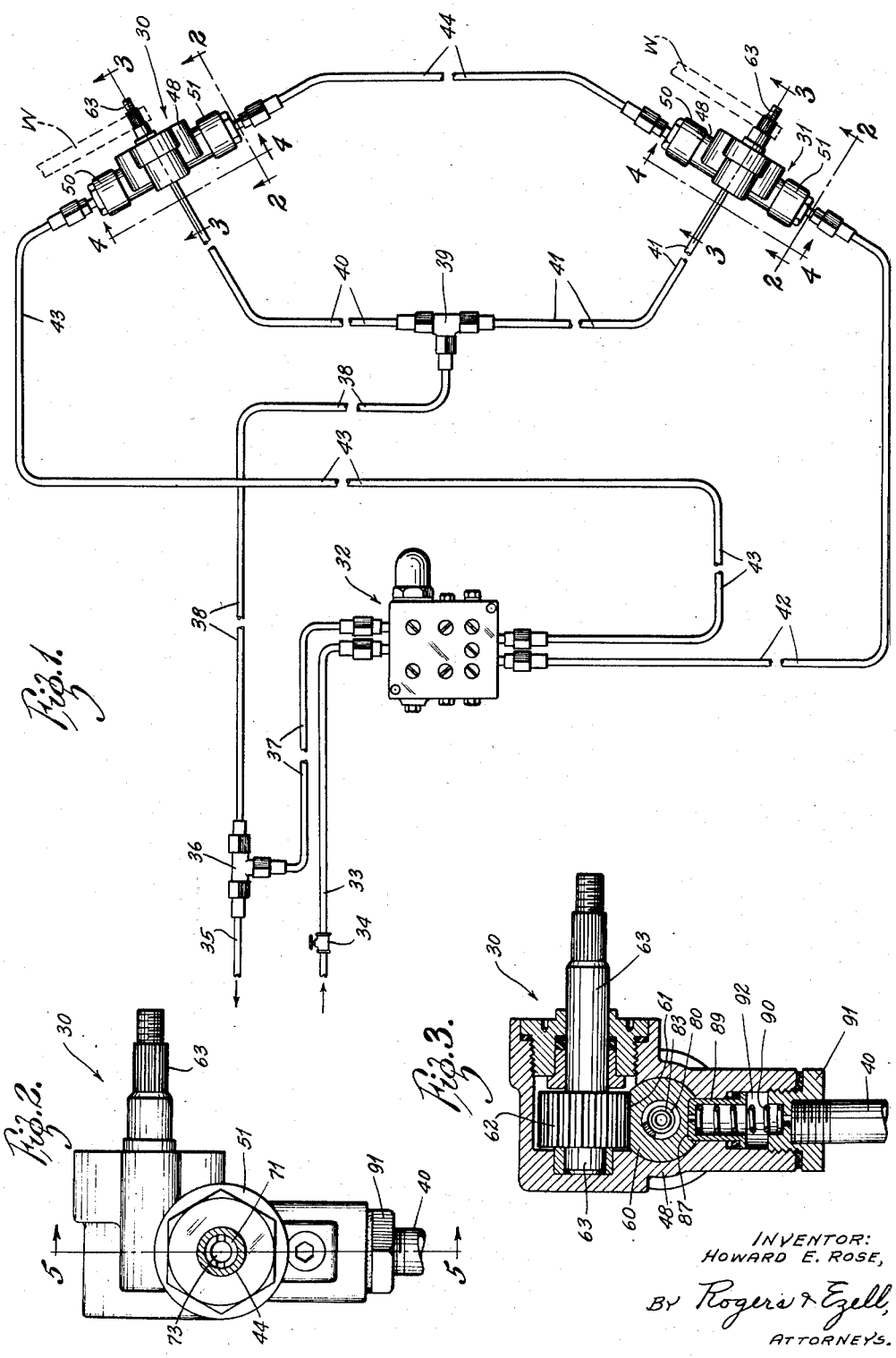

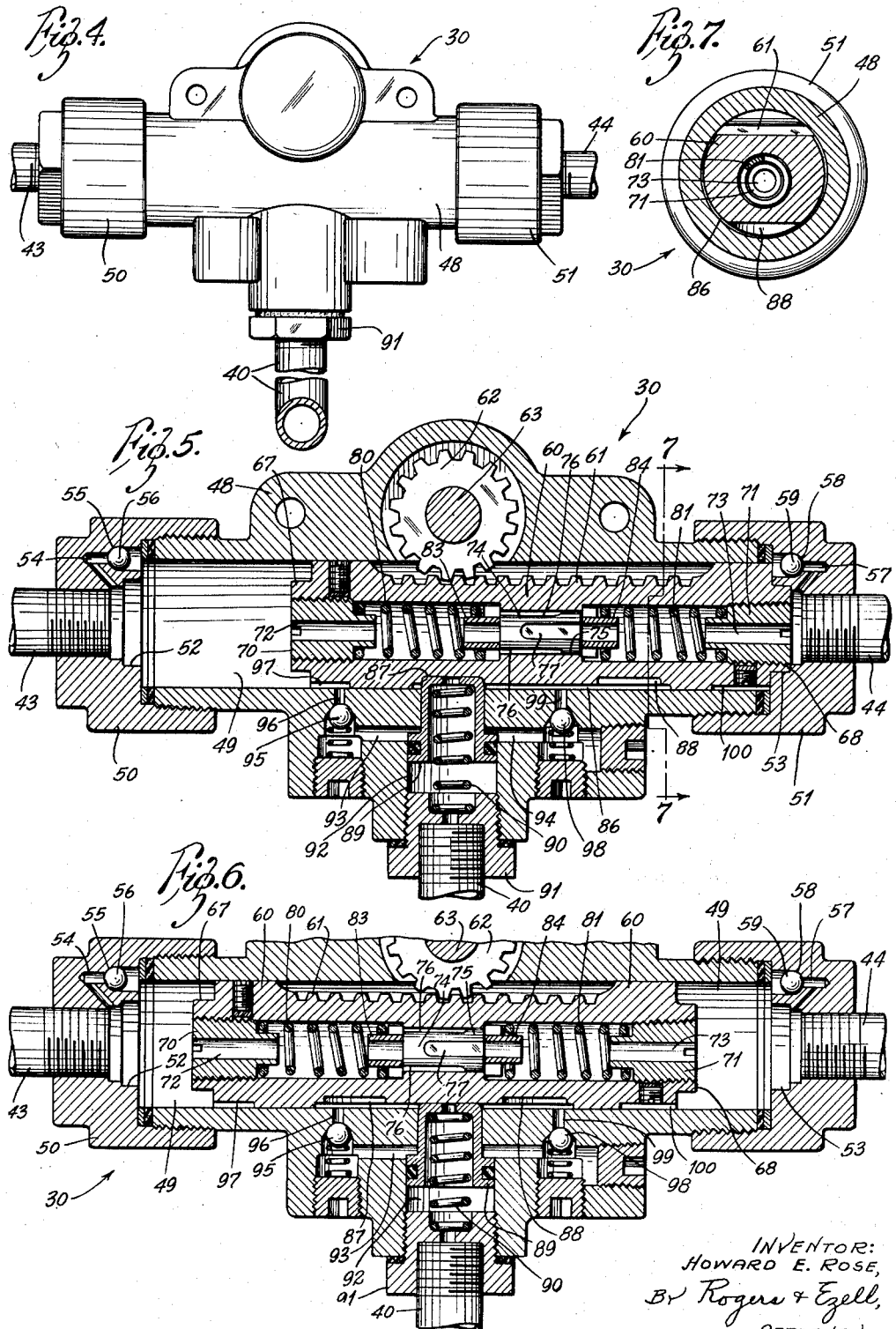

2,609,793

UNITED STATES PATENT OFFICE 2,609,793

PRESSURE RELEASABLE LOCKING MECHANISM FOR FLUID PRESSURE PISTONS

Howard E. Rose, Brecksville, Ohio, assignor, by mesne assignments, to Alco Valve Co., St. Louis, Mo., a corporation of Missouri Original application November 30, 1942, Serial No. 467,359. Divided and this application January 12, 1948, Serial No. 1,773

9 Claims. (Cl. 121—40)

1

The present invention relates to a pressure releasable locking mechanism for a fluid pressure piston. It also includes apparatus for exhausting pressure fluids that have bled around the pressure operated parts of mechanisms to the actuated parts of the mechanisms themselves.

It is an object of the invention to provide a mechanical locking mechanism that will secure a pressure operated piston in a chosen position along its length of travel, which lock has pressure operated means for effecting its release.

A further object of the invention is to provide a locking means of this kind which comprises a mechanical locking element that normally tends to lock the piston in one of its positions, but which is automatically withdrawn when the fluid pressure for operating the piston is applied thereto.

It is a specific object of the invention to provide such a locking means having a plurality of locking positions, and especially to provide such a locking means which may operate with a reverse acting piston that is subjected alternately to fluid pressure on its opposite ends.

Other objects include the provision of a locking mechanism for a fluid pressure operated windshield wiper which can hold the windshield wiper in one of its positions, and particularly in one of its extreme positions; and to provide such a lock for a windshield wiper that may selectively hold the windshield wiper in either of two extreme positions.

Other objects will appear from the description to follow.

In this application, reference is made to a piston and to a cylinder. It will be understood that these terms are used in a general sense unless otherwise specified and are designed to include various types of fluid chambers, usually generically called cylinders, in which movable members, usually generically called pistons, are operated back and forth by pressure differentials obtained on opposite sides of the movable members.

This is a division of application Serial No. 467,359, filed November 30, 1942 now Patent No. 2,446,611.

In the drawings:

Fig. 1 is a somewhat cut-away view of two windshield wiper units, a reversing valve, and a main control valve with their liquid line connections;

Fig. 2 is an end elevation of one of the windshield wiper units, taken on the line 2—2 of Fig. 1;

Fig. 3 is a transverse section through one of the windshield wiper units, taken on the line 3—3 of Fig. 1;

Fig. 4 is an elevation of one of the windshield wiper units, taken on the line 4—4 of Fig. 1;

Fig. 5 is a longitudinal section through one of the windshield wiper units, taken on the line 5—5 of Fig. 2, showing the piston in one extreme position;

Fig. 6 is a view similar to Fig. 5, but showing the piston in an intermediate position; and Fig. 7 is a vertical section on the line 7—7 in Fig. 5.

In general, the mechanism comprises one or more fluid motors, here shown as windshield wiper units, two being here shown at 30 and 31. The mechanism also includes a control valve 32. A line 33 is connected to a hydraulic pressure line through an adjustable cutoff or speed control valve 34. A return line 35 is likewise connected to the hydraulic system. This return line runs to a T 36 from which one branch 37 is connected into the control valve 32, and the other branch 38 extends to another T 39, from which the branches 40 and 41 are connected into the windshield units 30 and 31, respectively.

Two lines 42 and 43 lead from the control valve 32 to the wiper units 30 and 31, respectively. The two lines 42 and 43 are alternatively pressure and exhaust lines. The two units 30 and 31 are connected by a line 44.

The windshield units are identical, and Figs. 2 to 5 may be either one of them. For convenience in the following description, it will be assumed that Fig. 5 represents the wiper unit 30. This unit includes a housing 48 through which extends a cylinder 49. A head 50 is attached to one end and a head 51 to the other end. The head 50 receives the line 43 and the head 51 receives the line 44, so that the two lines 43 and 44 are put into communication with opposite ends of the cylinder. The cylinder head 50 has a reduced circular cutout 52 in it and a similar cutout 53 is found in the head 51. A small port 54 in the cylinder head 50 terminates in a valve seat 55 that receives a ball valve 56. This ball valve constitutes a check valve, as will appear. In the head 51, there are a similar port 57, a seat 58, and a ball valve 59.

Reciprocable within the cylinder 49 is a piston 60. This piston has a rack 61 on its upper surface that engages with a gear 62 mounted on a shaft 63 to drive the windshield wiper W back and forth.

The piston is symmetrical about its center transverse section. At one end, it is cut away to provide a small head portion 67 having a loose fit with the cutout 52 in the head 50. A corresponding portion 68 cooperates with the cutout 53 in the head 51.

The piston has an opening running from one end to the other thereof. This opening is threaded at each end to receive plugs 70 and 71. These plugs are ported at 72 and 73, respectively. The piston opening at its middle portion has a reduced portion 74 to receive a slide valve 75. The valve 75 is not ported, but from its left-hand side in Fig. 5 it has two opposite flats 76 extending more than half the distance across the reduced part 74 of the piston. At right angles to the flats 76 are similar flats 77 extending from the right-hand end of the piston.

Springs 80 and 81 act against the two plugs 70 and 71. At their inner ends, these springs bear against spiders 83 and 84 engaging against the ends of the reduced portions 74. These spiders admit oil freely past them and into the flats 76 and 77. The spiders 83 and 84 are engageable against shoulders in the piston and thus locate the valve in a central position.

The piston 60 is provided with a relief groove 86, into which are disposed two notches 87 and 88 on its lower side. These are adapted to be engaged by a cup-like plunger 89, and, as will appear, will retain the wipers in their rest positions. The plunger 89 is urged into engaging position by a spring 90 abutting against a fitting 91 that receives the exhaust line 40. The piston 89 operates within a cylindrical opening 92 in the housing 48.

The upper portion of the cylinder 92 is connected with two passages 93 and 94. The passage 93 leads to a ball-type check valve 95, from which a port 96 extends for communication with the left end of the main cylinder 49 of the mechanism. This communication is limited to such times as a notch 97 in the piston 60 registers with the port 96. Similarly, the port 94 communicates with the ball-type check valve 98 opening into a port 99 that may register with a notch 100 in the other end of the piston.

*Operation*

The operation will be described in connection with hydraulically operated windshield wipers, as the mechanism is especially valuable therein. However, it is usable elsewhere than in windshield wipers, and by fluid other than liquid. Also, the pressure differentials may be obtained by pressure reduction below a normal fixed pressure, rather than by pressure increase above the same, as illustrated by the difference between hydraulically operated windshield wipers and those operated from engine intake manifold vacuum.

During operation, when hydraulic fluid is admitted through the line 44, it creates a pressure against the right-hand end of the piston, displacing the piston until it is stopped either at the end of its normal stroke or prior thereto. After such stopping of the piston, the pressure builds up against the right-hand end of the valve 75 and displaces it or not, depending upon the other wiper's position. As the pressure builds up through the notch 100, it flows past the ball-type check valve and maintains the locking piston 89 down against the spring 90. Upon a subsequent reversal of the oil pressures, the check valve 98 retains the pressure upon the piston 89 until the high pressure is subsequently introduced through the line 43 and the notch 97 to act upon the piston back in the same manner.

The pressure oil flowing into the right end of the cylinder 49 acts against the piston 60, and applies pressure to the right end of the valve 75. The resistance of the springs 80 and 81 is greater than the normal resistance of the wipers and the mechanism in regular operation. For instance, the valve 75 may have a resistance of 250 p. s. i., which is greater than the normal operating resistance of the movable parts of the wiper. Hence, the entire piston 60 usually moves to the left to the end of its stroke, without alteration of the position of the valve 75 in the piston. When the piston is stopped, the resistance goes quickly beyond the 250 p. s. i., and the valve 75 is forced to the left, permitting oil to flow through the piston, into the line 44 and against the piston of the other wiper unit, moving it to the left, until it has reached its other position.

At this point, the pressure again rises. It must be above 250 p. s. i. to have held the valve 75 open. When the piston of the second unit stops, the pressure begins to act upon its valve 75 against its additional resistance of 250 p. s. i.

The reversing valve mechanism 32 is described in detail in the parent case referred to, and here it need only be mentioned that it is designed always to reverse the high pressure and low pressure connections when the pressure in the existing high pressure line attains a value greater than that of one valve 75, but less than that of all of the valves 75 in series. Where the springs 80 and 81 load the valves 75 to 250 p. s. i. each, a reversing valve pressure of 400 p. s. i. is typical.

When the control valve reverses, the line 43 becomes an exhaust line, and pressure is applied to the line 42 to move the wipers back. At such time, the oil between the pistons, including that in the line 44, will remain practically undiminished. Therefore, both wipers move back in synchronism. At the end of this reverse stroke, both valves 75 are urged open simultaneously, offering their combined resistance of 500 p. s. i., and the control valve will again reverse.

During continued operation, the two valves 75 may open only as necessary to keep the oil supply between the pistons full.

The foregoing values are only typical. The critical factors are to have the combined ordinary operating resistances of the wipers, plus that of all of the valves 75 except one, less than the resistance of the reversing valve, but to have the combined resistance of all the valves 75 greater than that of the reversing valve. Pressures in valves obviously means pressure differentials between the high pressure and low pressure sides.

It will be observed by referring to Fig. 5 that a dashpot action is provided at each end of the stroke of each piston. For example, as the piston 60 moves to the left in Fig. 5, at the end of its stroke, the projection 67 will begin its loose engagement in the smaller cylindrical portion 52. This means that a quantity of oil is retained between the cylinder head and the piston head, which is checked by the seating of the ball 56. This trapped oil can escape only around the loose fit of the portion 67 in the portion 52. Thus, a dashpot action is provided. This, of course, is relieved to permit the piston to move away from the cylinder head by the moving of the check ball 56 from its seat.

As has been noted, the plunger 89 is adapted to lock the pistons in either of their extreme positions. If the pistons are locked at the start of any cycle of operation, one of the slots 97 or 100 will be in registry with either port 96 or 99, respectively.

Assume the pistons are at the right as shown in Fig. 5. If, upon restart by opening of the valve 34, pressure returns through the line 43, it flows through the port 96 to depress the plunger 89. It also displaces the valve 75, flows through the line 44, and acts to depress the locking plunger in the piston of the other wiper unit. After this has occurred, its further effort to displace the other valve 75 results in reversal of the control valve, attended by a lowering of the pressure on the left side of the pistons. But the check valves 95 retain the previously introduced high pressure oil against the plunger 89 so that it is held down. The supply of oil at high pressure for such purpose is renewed at the end of each stroke.

If the start occurs with the pressure introduced at the end of the cylinders where the pistons are then located, as at the right ends of the pistons in Fig. 5, oil under pressure moves or tends to move the valve 75 of the rightward one of the pistons, and thereby applies pressure to the oil to the left of such piston. This latter pressure causes oil to flow back through its ball check valve 95 to release its locking plunger, prior to causing the control valve 32 to reverse. Upon reversal of the control valve, and consequent reduction of the pressures aforesaid, the check valve 95 retains the high, unlocking pressure against the locking plunger 89 of the rightward piston. When pressure reversal is completed, high pressure is introduced to the left end of the other piston, and acts past its check valve 95 to unlock its locking plunger 89. Finally, on an additional reversal, the wipers will start.

It is readily apparent how unlocking will occur if only one wiper is locked.

The relief groove 86 extends around the piston. It is always in communication with one of the ball valves, and thereby readily releases any pressure that might build up around the wiper shaft, as these valves have relatively light resistance. The disposition of the detent notches 87 and 88 in this groove prevents scraping of the cylinder by any burrs on their edges that might be turned up by the detent plunger.

When the main speed control valve 34 is closed, the pressure acting against the piston 89 gradually bleeds around the upper part of the piston and through the opening in the top thereof to relieve itself through the line 40. Also, pressure on one or the other sides of the piston 60 gradually relieves itself around the piston and into the tube 40. When the piston 89 is relieved, it is moved by its spring 90 into one of the notches 87 or 88 and locks the wiper in position until the operation is started again. This is a mechanical lock. It will be observed that this mechanical lock can be relieved whenever pressure is built up enough through one of the notches 97 or 100 to force back the locking piston.

An adjustment of the cutoff valve 34 alters the speed with which the various pressures can be built up, and, therefore, it varies the speed of operation of the entire mechanism.

If one of the wipers is blocked, as by slush or ice, the other operates through its complete cycle and the blocked one operates through the sweep permitted by the obstruction. If both are blocked, they sweep through the stroke permitted. This comes about because a blocking of one wiper unit limits the movement of its piston with the same effect on the pressures as if the piston had reached the end of its stroke. In subsequent operations, the wiper will strike against the obstruction with some force and may clear it away by repeatedly beating it.

If the wipers become desynchronized, they will always resynchronize, because they never reverse from either direction until all have been stopped.

If one of the wipers becomes permanently blocked in a fixed position, the other wiper will continue to operate through its full permitted stroke. Also, both wipers may operate on a limited stroke or one in a stalled, and the other on a limited stroke. In every case, resynchronization is automatic.

The number of wiper units used can be multiplied indefinitely. It is necessary only to have the total resistances of all of the valve 75 in series greater than the neutralizing force on the reversing valve, but with any less than the total number less than the neutralizing force on the reversing valve.

The mechanism can be used with one wiper, as the unit 30, in which case, when the piston 60 would stop, the control valve would shift. Advantages of operating a single wiper this way are that it would not require a full stroke to reverse itself, and that it would have the beating action tending to break down any obstructions to its cycling for its full sweep.

What is claimed is:

1. In combination, a cylinder, a piston-like member movable oppositely therein, a recess in the member, a locking element movably mounted on the cylinder for engagement with the recess to lock the piston member and cylinder together, and for withdrawal from locking position, pressure-responsive means including a movable wall connected to the locking element, passage means between the pressure-receiving part of the cylinder and the movable wall to conduct fluid pressure from the cylinder to the movable wall to move it and withdraw the locking element from the piston member, check valve means to prevent back-flow of fluid under pressure in the passage means, means providing predetermined escape for the pressure from the movable wall, and springing means acting to urge the locking element into locking position.

2. In combination, a cylinder, a piston-like member movable oppositely therein, a recess in the member, a locking element movably mounted on the cylinder for engagement with the recess to lock the piston member and cylinder together, and for withdrawal from locking position, pressure-responsive means including a movable wall connected to the locking element, passage means between the opposite sides of the piston member and the movable wall to conduct fluid pressure from the cylinder to the movable wall to move it and withdraw the locking element from the piston member, and springing means acting to urge the locking element into locking position, said passage means comprising opposite passages in the cylinder walls from the wall and connecting into opposite ends of the cylinder, check valve means in each passage to retain pressure conditions produced upon said wall.

3. In combination, a cylinder, a piston oppositely movable therein, bypass means from one side of the piston to the other, resistingly yieldable valve means controlling the bypass, and closing the same until a predetermined pressure differential exists on opposite sides of the piston, a locking mechanism including a movable pressure operated wall and a locking element connected therewith for movement into and out of locking interengagement between the piston and cylinder, opposite passage means in the cylinder from the movable wall to the opposite ends of the cylinder, the piston opening one passage at each end of its movement in the cylinder, whereby pressure conditions developed in the ends of the cylinder may be transmitted to the wall to operate the locking mechanism.

4. In a mechanism of the kind described, a main cylinder, a piston reciprocable therein, mechanism operated by the piston including a power take-off between the ends of the piston, means to admit fluid under pressure to opposite ends of the piston, a groove on the surface of the piston between the ends thereof to provide a channel communicating with the power take-off, pressure relief means comprising a port in the cylinder communicating with said channel, yieldable relief valve means adapted to control flow through the port, said groove being shaped to establish communication with the port in any position of the piston in the cylinder, and a locking means, said locking means comprising a second cylinder and a plunger therein, detent depressions in the piston engageable by the plunger, means urging the plunger toward said detents, said port communicating with the second cylinder to dispose fluid passing through said relief valve means against the plunger to withdraw it from the detent depressions, and means admitting fluid from the ends of the main cylinder to said port at the end of each stroke of the piston.

5. A double-acting piston motor adapted for continuous reciprocating movements comprising: a cylinder and a piston movable back and forth therein with fluid pressure chambers at its opposite ends and designated forward and reverse pressure chambers, one chamber being connectible to receive fluid under high pressure while the other receives fluid under low pressure, and vice versa; fluid pressure operated locking means to lock the piston against movement, and means to release the lock when high pressure fluid is delivered to either pressure chamber, the locking means including a locking element interengaging the piston and cylinder and a moving member connected therewith that is movable by fluid pressure; passage means connected from each pressure chamber to the moving member to admit high pressure fluid to the moving member whereby it may release the locking element each time high pressure is applied to either pressure chamber, and checking valve means controlling each passage means to prevent escape of such high pressure during the operating intervals to the pressure chamber having low pressure therein.

6. The combination of claim 5, wherein there is means to provide escape of fluid from the moving member when the fluid pressure to the pressure chambers is cut off, and means normally urging the locking element into locking position.

7. The combination of claim 5, wherein the passage means connect into the respective pressure chambers at points that establish communication only after the respective pressure strokes of the piston have become started by at least some piston displacement; bypass means from one side of the piston to the other to establish communication between the two pressure chambers; pressure-responsive valve means controlling flow through the bypass means and connected to receive pressures in the pressure chambers, including means yieldable only to pressures higher than the normal piston-operating pressures to open the valve means and permit high pressure fluid from one pressure chamber to pass to the other and release the locking element.

8. The combination of claim 5 wherein the locking element is interengageable to lock the piston and cylinder at both ends of the stroke of the piston.

9. A piston motor having a cylinder and a piston, a lock for interlocking the piston and cylinder, a fluid pressure-responsive member for releasing the lock, passage means connecting the fluid pressure-responsive member and the cylinder to deliver high pressure fluid to the member to cause it to release the lock, check valve means in the passage means to withhold escape of the pressure fluid back into the cylinder when pressure therein is relieved; means to permit escape of fluid pressure from the pressure-responsive member, and resilient means urging the lock into locking position.

HOWARD E. ROSE.

REFERENCES CITED

The following references are of record in the file of this patent:

UNITED STATES PATENTS

| Number | Name | Date |
|---|---|---|
| 1,989,387 | Vickers | Jan. 29, 1935 |
| 2,130,613 | Gnavi | Sept. 20, 1938 |
| 2,139,185 | Engel | Dec. 6, 1938 |
| 2,180,154 | Lenz | Nov. 14, 1939 |
| 2,258,376 | Clothier | Oct. 7, 1941 |
| 2,294,467 | Lemonier | Sept. 1, 1942 |
| 2,342,812 | Martinson | Feb. 29, 1944 |
| 2,415,607 | Sacchini | Feb. 11, 1947 |
| 2,442,577 | Ashton | June 1, 1948 |